UNITED STATES PATENT OFFICE.

AUGUST RICHARD ROOSEN, OF HAMBURG, GERMANY.

PRESERVATION OF FOOD SUBSTANCES.

SPECIFICATION forming part of Letters Patent No. 350,018, dated September 28, 1886.

Application filed July 6, 1885. Serial No. 170,782. (No specimens.)

*To all whom it may concern:*

Be it known that I, AUGUST RICHARD ROOSEN, a citizen of Germany, residing at Hamburg, Germany, have invented certain new and useful Improvements in Processes of Preserving Food and other Substances; and I do hereby declare the following to be a full, clear, and exact description of the invention, such as will enable others skilled in the art to which it appertains to make and use the same.

The invention relates to the preservation of food-substance or of any nitrogenous or other matter subject to eremacausis, decay, fermentation, or putrefaction, or the formation of mold or the presence of bacilli or other vegetable or animal growth, whether microscopic or visible to the naked eye, such as mites, bugs, worms, and the like.

The object is to preserve such matter in transportation or storage.

The invention consists in placing the substance to be preserved, without any previous treatment by suction or by injection with an antiseptic and without surrounding the substance with caoutchouc or other envelope, into a receptacle capable of being hermetically sealed, and then forcing in a liquid preservative, thereby expelling the air from the receptacle and from the interstices of the substances to be preserved and impregnating it under pressure, and finally sealing the receptacle, keeping the substances to be preserved, stored, or transported under continuous (permanent) pressure of the liquid preservative contained in the air-tight receptacle then until used, the substance to be stored or transported being kept from first to last under pressure of the same body of liquid preservative first injected—that is to say, there being but a single operation in the matter of subjecting the substance to the action of the preservative, as hereinafter more fully set forth. The preservation of substances in transportation or storage is thus effected in a simple manner.

In the practice of my invention I place the substance to be kept preserved into the cask or receptacle in which it is to be stored or transported. The vessel must be strong enough to resist a certain internal pressure. When nearly filled, I pour an antiseptic solution over the contents of the vessel, thereby filling it. The vent or orifice of the vessel is then closed with an air-tight cover. By means of a pressure-pump, which can be connected with the vessel by a connecting-pipe, additional solution is pumped into the vessel, and as the solution enters it the air from the vessel is expelled through an air-pipe, which is closed when the solution spurts out of it. The pumping is then continued until a pressure-gage fixed on the connecting-pipe indicates the pressure desired to be obtained in the vessel. The inlet of the solution is then closed and the pump detached. The contents of the vessel then remain under pressure, and as no air is left in the vessel nor can penetrate into it the antiseptic solution maintains its power, and under its continuous action the substance can undergo no change. It seems to penetrate the substance and to permeate the same and to continue so to do, the substance thus remaining charged in the presence of a superabundant quantity of the antiseptic. It will thus be seen that the substance to be preserved is subjected to but a single quantum or dose of the antiseptic and without necessity of any previous preservative treatment. If the food is in a liquid state, I completely fill the vessel with the liquid to which the preservative has been added. More liquid is then forced into the vessel, so that the air is expelled, and the air-pipe is then closed, as above described, and the required pressure is created by further pumping after the vessel has been hermetically closed. It is immaterial how the pressure is maintained, so that the substance to be preserved remains impregnated by this pressure; hence the pressure may be maintained by a gas within the closed receptacle acting upon the preservative liquid as a spring or cushion. Any other animal substance or any vegetable substance—such as plants, vegetables, grains, and cereals—may be preserved in the same way. Any of the well-known antiseptics or antiseptic compounds which are harmless or non-injurious to health will answer as the preservative; also common salt and a saline solution or sea-water.

A vessel of any form and of any material—such as a cask or can—which is air-tight and capable of resisting internal pressure will answer the purpose of the invention.

I do not limit myself to any particular pressure. One to six atmospheres and more (above ordinary atmospheric pressure) may be applied.

I do not claim, broadly, keeping a substance to be stored or transported under continuous pressure of the same preservative.

Having now particularly described and ascertained the nature of my said invention, and in what manner the same is to be performed, what I desire to claim and secure by Letters Patent is—

The method of preservation for storage or in transportation of food substance in solid or other form, fish, flesh, or liquid, or of any nitrogenous or other matter liable to change, eremacausis, decay, or putrefaction, or to the formation of mold or the presence of bacilli or other objectionable organisms, whether microscopic or visible to the naked eye, like mites, bugs, worms, or the like, which consists in placing it in a receptacle capable of being hermetically sealed, then directly filling the receptacle with a liquid preservative, and charging it and the substance to be preserved with such liquid preservative, and then at once closing the receptacle and retaining the substance to be preserved under continuous pressure of the body of the preservative thus first supplied until used, substantially as set forth.

In testimony whereof I affix my signature in presence of two witnesses.

AUGUST RICHARD ROOSEN.

Witnesses:
GEORG MACKAY,
BERNH SOLL.